(12) United States Patent
Kim

(10) Patent No.: US 12,338,126 B2
(45) Date of Patent: Jun. 24, 2025

(54) APPARATUS FOR DISPERSING CARBON NANOTUBES

(71) Applicant: YUNSUNG F&C CO., LTD., Anseong-si (KR)

(72) Inventor: Han Sung Kim, Gwangju-si (KR)

(73) Assignee: YUNSUNG F&C CO., LTD., Anseong-si (KR)

( * ) Notice: Subject to any disclaimer, the term of this patent is extended or adjusted under 35 U.S.C. 154(b) by 521 days.

(21) Appl. No.: 17/918,419

(22) PCT Filed: Apr. 16, 2021

(86) PCT No.: PCT/KR2021/004815
§ 371 (c)(1),
(2) Date: Oct. 12, 2022

(87) PCT Pub. No.: WO2021/210949
PCT Pub. Date: Oct. 21, 2021

(65) Prior Publication Data
US 2023/0146721 A1  May 11, 2023

(30) Foreign Application Priority Data
Apr. 17, 2020  (KR) .................. 10-2020-0046385

(51) Int. Cl.
*B01F 23/50* (2022.01)
*B01F 27/50* (2022.01)
(Continued)

(52) U.S. Cl.
CPC .......... *C01B 32/174* (2017.08); *B01F 23/551* (2022.01); *B01F 27/50* (2022.01); *B01F 35/71815* (2022.01)

(58) Field of Classification Search
CPC ...... C01B 32/174; B01F 23/551; B01F 27/50; B01F 35/71815; B01F 2025/913;
(Continued)

(56) References Cited

U.S. PATENT DOCUMENTS

2014/0078853 A1* 3/2014 Cool .................. B01J 19/008
366/108

FOREIGN PATENT DOCUMENTS

JP     2017-112319 A    6/2017
KR  10-2011-0109730 A   10/2011
(Continued)

OTHER PUBLICATIONS

International Search Report in International Application No. PCT/KR2021/004815, mailed Jul. 27, 2015 (5 pages).
(Continued)

*Primary Examiner* — Anthony J Zimmer
(74) *Attorney, Agent, or Firm* — Osha Bergman Watanabe & Burton LLP (57) ABSTRACT

A apparatus for dispersing carbon nanotubes according to the present invention includes: a solution receiving part including a solution receiving body portion, a flow pipe portion formed by passing through an inside of the solution receiving body portion, and through which a CNT solution flows, and a spiral guide portion formed on an inner wall of the flow pipe portion and configured to guide the CNT solution to spirally flow; and an ultrasonic vibrator part mounted on an outer wall of the solution receiving body portion, and configured to provide ultrasonic waves to the CNT solution, wherein the spiral guide portion has a right spiral type and a left spiral type alternately formed on the inner wall of the flow pipe portion so that a rotation direction is changed twice or more.

6 Claims, 8 Drawing Sheets

(51) Int. Cl.
*B01F 35/71* (2022.01)
*C01B 32/174* (2017.01)

(58) Field of Classification Search
CPC ...... B01F 25/431951; B01F 25/431971; B01F 27/1123; B01F 27/1152; B01F 27/84; B01F 31/84; B01F 33/813; B01F 33/8212; B01F 25/43141; B01F 33/82; B01F 2215/0431; B01F 2215/0445; B01F 23/50; B82Y 40/00; B82Y 30/00; Y02E 60/10

See application file for complete search history.

(56) References Cited

FOREIGN PATENT DOCUMENTS

| | | |
|---|---|---|
| KR | 10-2016-0083655 A | 7/2016 |
| KR | 10-2016-0110401 A | 9/2016 |
| KR | 10-2017-0019568 A | 2/2017 |
| KR | 10-2019-0091833 A | 8/2019 |

OTHER PUBLICATIONS

Written Opinion in International Application No. PCT/KR2021/004815, mailed Jul. 27, 2015 (3 pages).

\* cited by examiner

APPARATUS FOR DISPERSING CARBON NANOTUBES

TECHNICAL FIELD

The present invention relates to an apparatus for dispersing carbon nanotubes, and more specifically, to an apparatus for dispersing carbon nanotubes, which may rapidly disperse a carbon nanotube bundle without damaging a carbon nanotube.

BACKGROUND ART

Lithium ion batteries are manufactured by a process of making a slurry in which an active material powder for each positive electrode and negative electrode is dispersed in a solution, coating and drying the slurry on an electrode plate, overlapping positive and negative electrode plates manufactured with a separator interposed therebetween, putting the positive and negative electrode plates into a container, and injecting an electrolytic solution thereinto. When the slurry is made, it is possible to improve performance of the battery by mixing a conductive agent that functions to facilitate a smooth flow of electricity between the active material powders to make the slurry.

Carbon nanotubes (CNT) have a form of a line having a length of several thousand times the diameter, electrical conductivity similar to copper, and an excellent function as a conductive agent. When the carbon nanotubes are used, more space can be secured in the battery than when conventional conductive agents are used, and thus a battery capacity can be increased by putting more active materials into the remaining space.

However, the carbon nanotubes need to be evenly dispersed in the solution to use the carbon nanotubes because the carbon nanotubes have a form in which several strands are entangled in bundles. A method of dispersing a carbon nanotube used in the related art includes a physical dispersion method using ultrasonic waves or bead mills, and a chemical dispersion method using a surfactant or the like.

Among the physical methods, an ultrasonic dispersion method is a method of dispersing the carbon nanotube by applying ultrasonic waves after putting a carbon nanotube powder into an organic solvent such as n-methyl-2-pyrrolidone (NMP) or dimethylformamide (DMF), but this method has a problem that the stability of the solution is degraded.

Meanwhile, among the physical methods, a method using bead mills, a high shear disperser, or the like has a problem in that a length of the carbon nanotube is reduced because the strands of the carbon nanotube are cut.

The chemical method has a problem in that it requires an additional process of attaching and removing chemical substances in addition to components required for the battery. Accordingly, there is a need to solve the problems.

A background art of the invention is disclosed in Korean Patent Application Laid-Open No. 10-2019-0091833 (published on Aug. 7, 2019, entitled METHOD OF MANUFACTURING CARBON NANOTUBE DISPERSION SOLUTION).

Technical Problem

The present invention has been made in efforts to solve the above problems and is directed to providing an apparatus for dispersing carbon nanotubes, which can rapidly disperse a carbon nanotube bundle without damaging a carbon nanotube.

Technical Solution

An apparatus for dispersing carbon nanotubes according to the present invention includes: a solution receiving part including a solution receiving body portion, a flow pipe portion formed by passing through an inside of the solution receiving body portion, and through which a CNT solution flows, and a spiral guide portion formed on an inner wall of the flow pipe portion and configured to guide the CNT solution to spirally flow; and an ultrasonic vibrator part mounted on an outer wall of the solution receiving body portion and configured to provide ultrasonic waves to the CNT solution, wherein the spiral guide portion has a right spiral type and a left spiral type alternately formed on the inner wall of the flow pipe portion so that a rotation direction is changed twice or more.

In the present invention, a Reynolds number of the CNT solution is calculated by an equation below, and an inner diameter of the flow pipe portion is set so that the Reynolds number is 4,000 or less.

The equation is $$Re = \frac{\rho V D}{\mu},$$

where μ refers to a viscosity coefficient of the CNT solution, V refers to a velocity of the CNT solution, D refers to an inner diameter of the flow pipe portion, and ρ refers to a density of the CNT solution.

In the present invention, the apparatus for dispersing carbon nanotubes may further include a conical dispersion part mounted an inside an outlet of the flow pipe portion, and configured to allow the CNT solution to collide and be discharged to an outside of the outlet along an inclined surface.

In the present invention, the flow pipe portion may include a straight pipe portion configured to guide the CNT solution to flow linearly toward the outlet.

In the present invention, the spiral guide portion may be formed with grooves recessed in or protrusions protruding from the inner wall of the flow pipe portion.

In the present invention, the ultrasonic vibrator part may include a contact portion configured to come into contact with an outer wall of the solution receiving body portion, and a width at which the contact portion comes into contact with the outer wall of the solution receiving body portion may be formed to be smaller than an inner diameter of the flow pipe portion, or less than twice the inner diameter of the flow pipe portion.

Advantageous Effects

According to the present invention, a CNT solution can be formed as a laminar flow while spirally flowing by a spiral guide portion of a solution receiving part and dispersed by an ultrasonic vibration of an ultrasonic vibrator part.

In addition, according to the present invention, it is possible to loosen a lump portion of the CNT solution by a conical dispersion part installed at an outlet of the solution receiving part.

In addition, according to the present invention, a plurality of apparatus for dispersing carbon nanotubes is disposed in parallel to circulate the CNT solution to a tank part, so that it is possible to solve problems such as damage to CNT strands, the difficulty in separating the lump of the CNT, the difficulty in evenly dispersing the entire solution, high manufacturing costs, and an increase in dispersion time, and evenly disperse the CNT in a solution.

MODES OF THE INVENTION

Hereinafter, an apparatus for dispersing carbon nanotubes according to one embodiment of the present invention will be described with reference to the accompanying drawings. In this process, thicknesses of lines or sizes of components shown in the drawings may be exaggeratedly shown for clarity and convenience of description.

In addition, the terms to be described below are terms defined in consideration of functions in the present invention, which may vary depending on intentions or customs of users and operators. Accordingly, these terms should be defined based on the contents throughout this specification.

Figure 1:
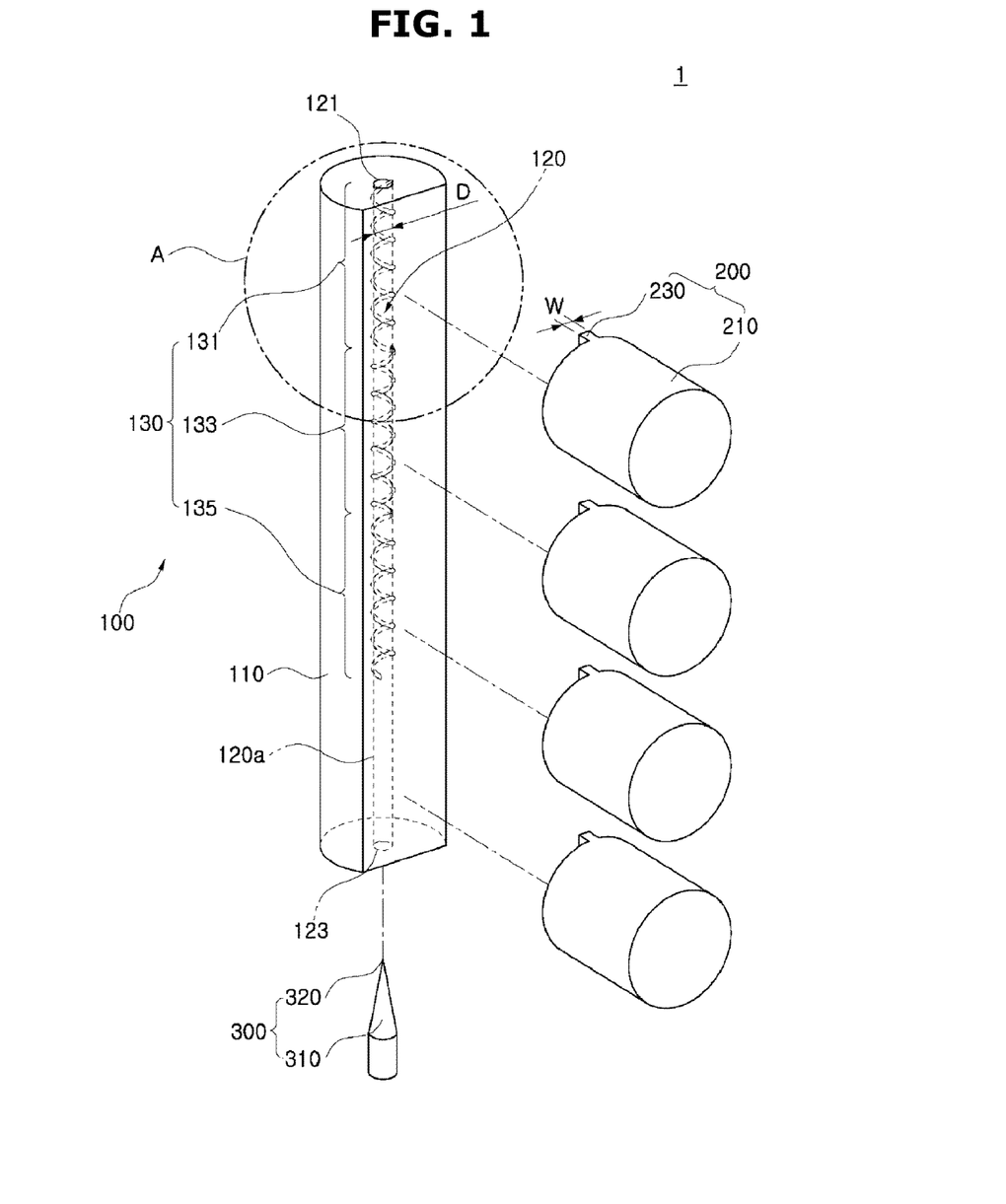
FIG. 1 is an assembly perspective view schematically showing an apparatus for dispersing carbon nanotubes according to one embodiment of the present invention.
Figure 2:
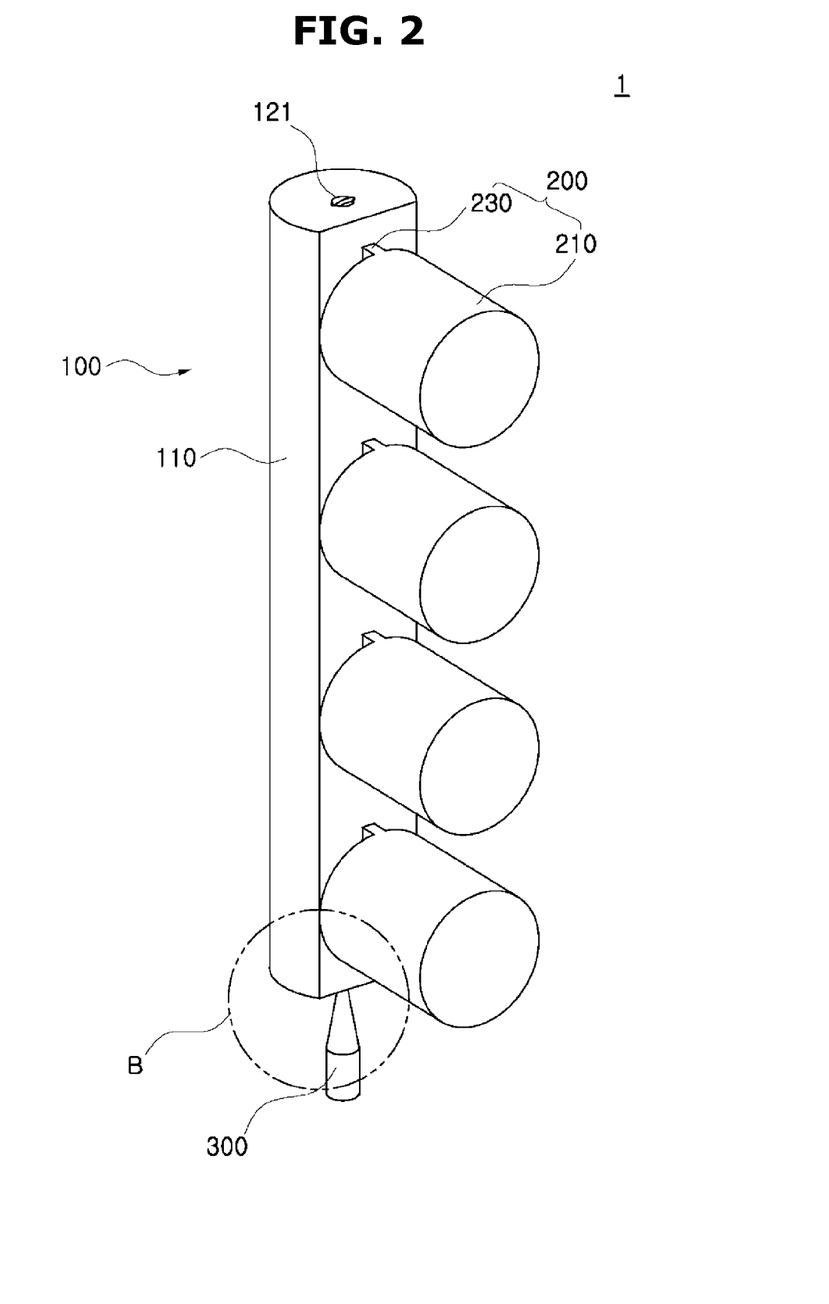
FIG. 2 is a perspective view schematically showing the apparatus for dispersing carbon nanotubes according to one embodiment of the present invention.
Figure 3:
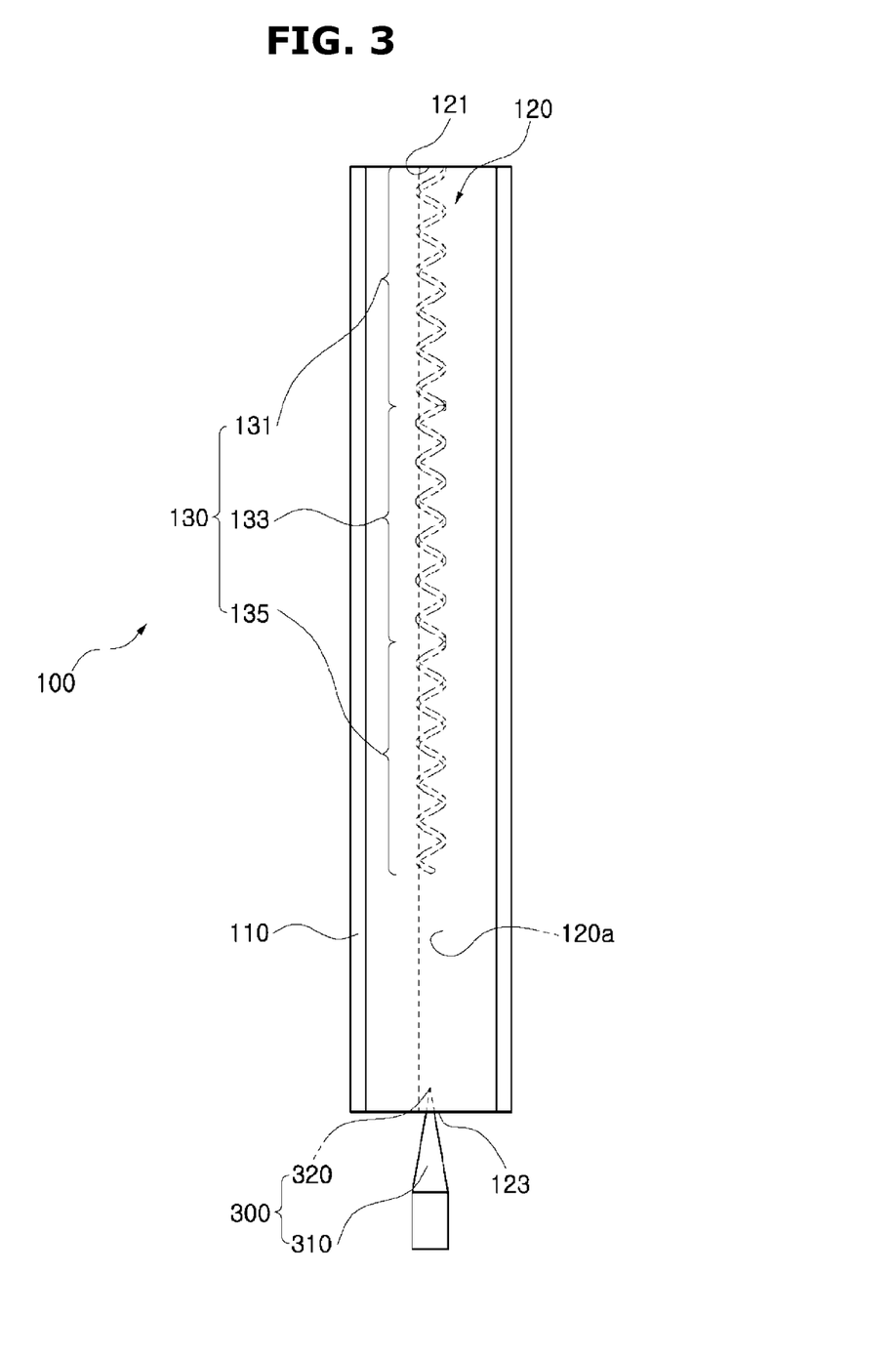
FIG. 3 is a front view schematically showing the apparatus for dispersing carbon nanotubes according to one embodiment of the present invention.
Figure 4:
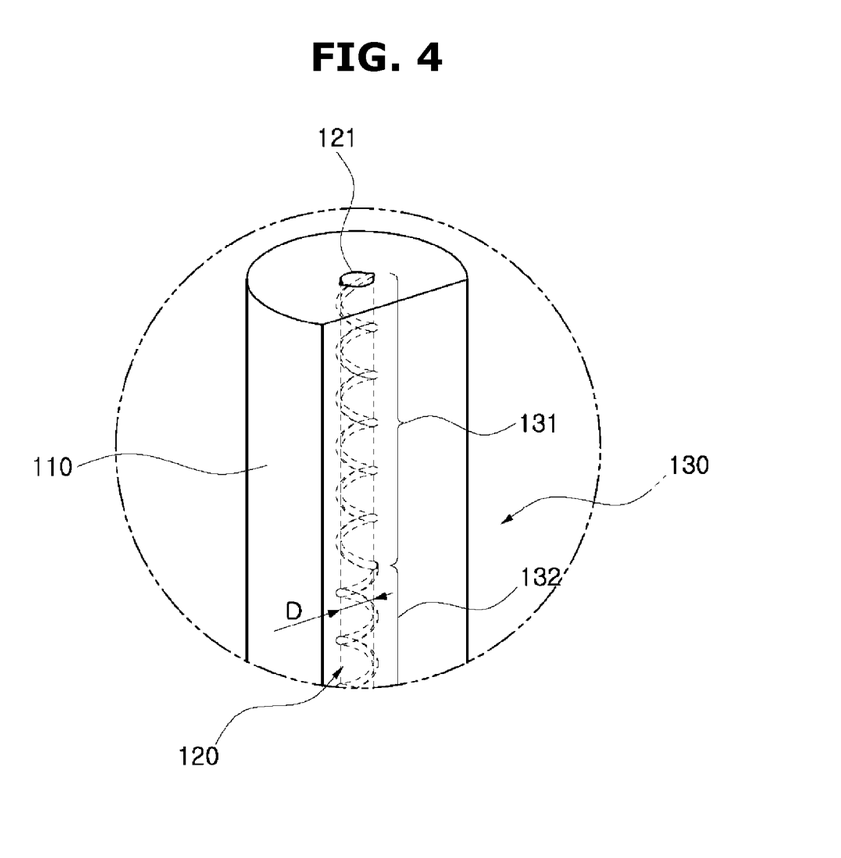
FIG. 4 is a partially enlarged view schematically showing portion 'A' in FIG. 1.
Figure 5:
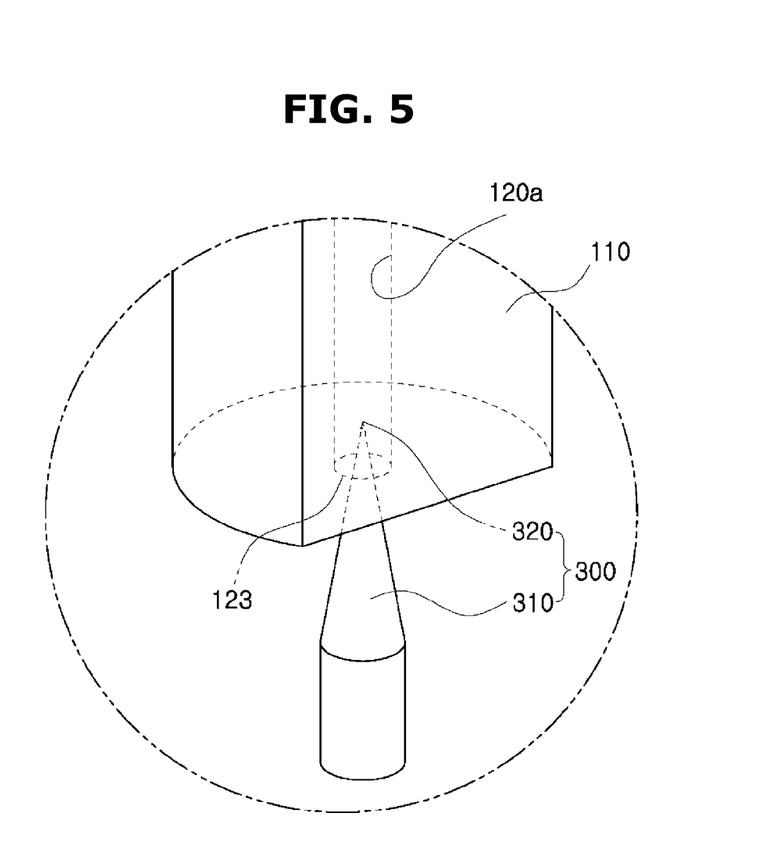
FIG. 5 is a partially enlarged view schematically showing portion 'B' in FIG. 2.
Figure 6:
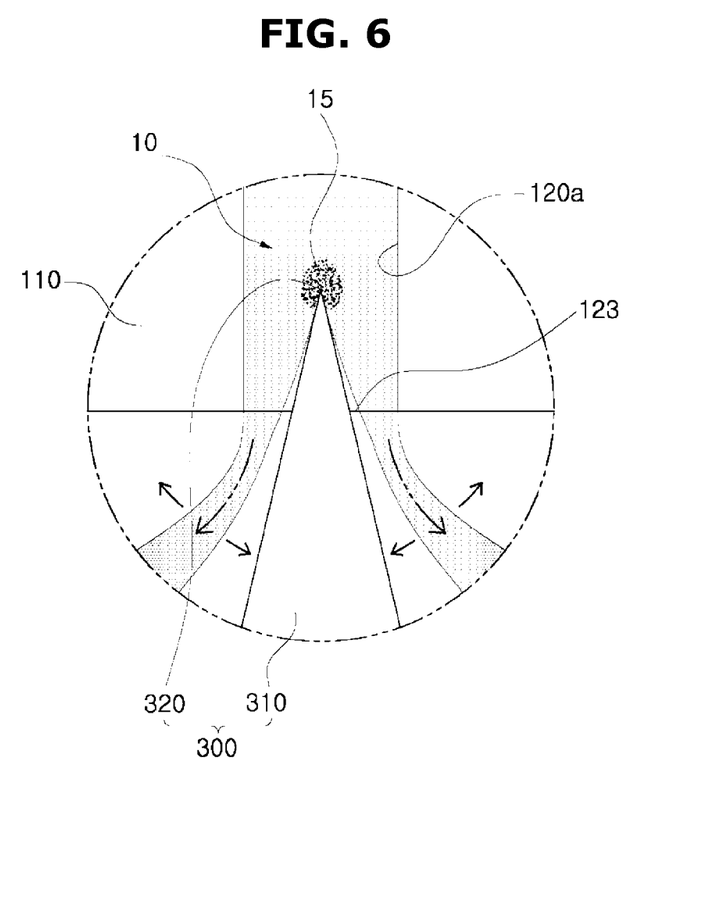
FIG. 6 is a conceptual diagram schematically showing a process of releasing a CNT lump portion of a CNT solution in a conical dispersion part according to one embodiment of the present invention.
Figure 7:
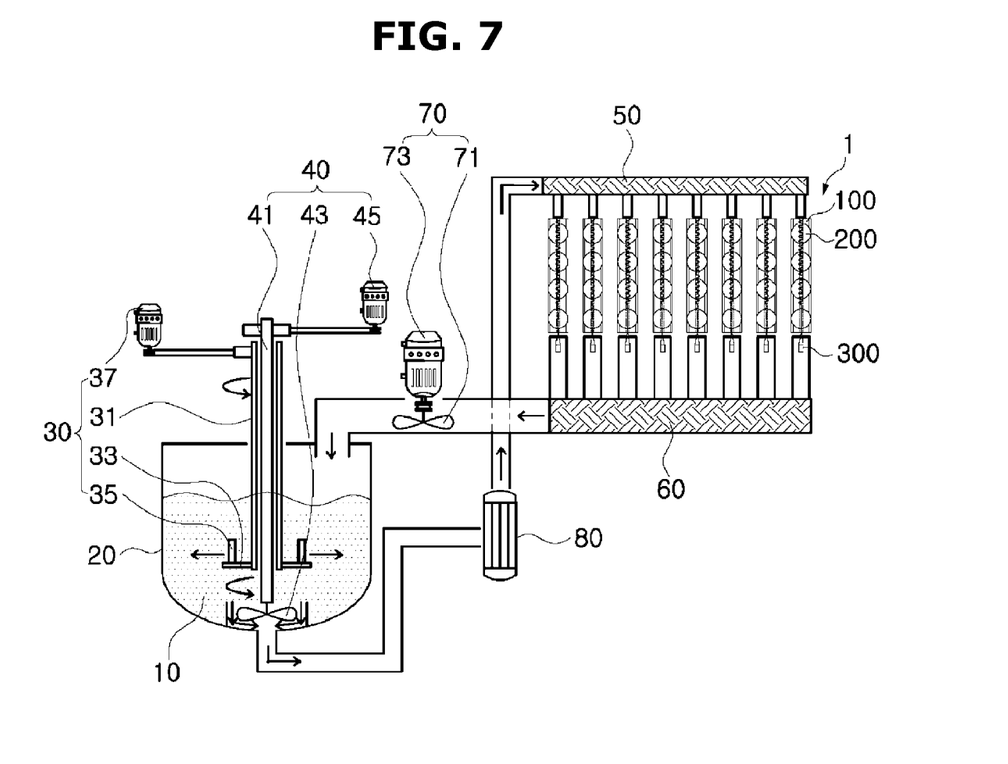
FIG. 7 is a conceptual diagram schematically showing a carbon nanotube dispersion integration device according to one embodiment of the present invention.
Figure 8:
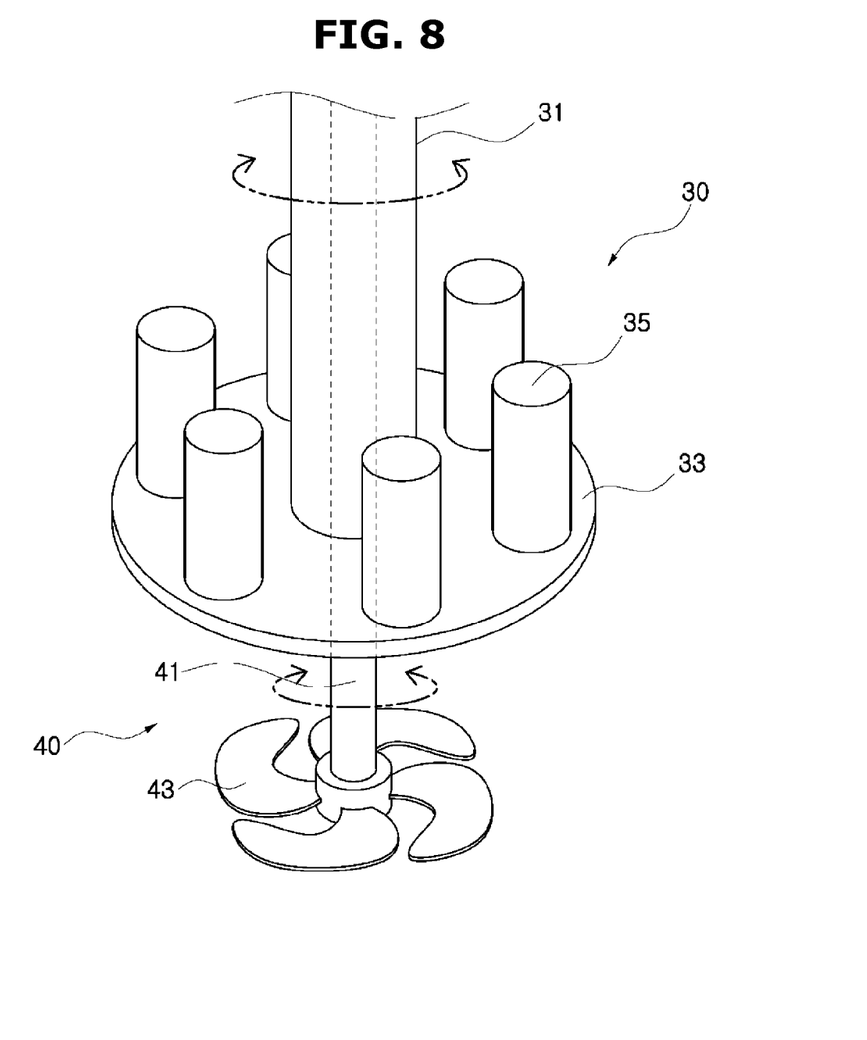
FIG. 8 is a perspective view schematically showing a first stirring part and a second stirring part according to one embodiment of the present invention.

FIG. 1 is an assembly perspective view schematically showing an apparatus for dispersing carbon nanotubes according to one embodiment of the present invention, FIG. 2 is a perspective view schematically showing the apparatus for dispersing carbon nanotubes according to one embodiment of the present invention, FIG. 3 is a front view schematically showing the apparatus for dispersing carbon nanotubes according to one embodiment of the present invention, FIG. 4 is a partially enlarged view schematically showing portion 'A' in FIG. 1, FIG. 5 is a partially enlarged view schematically showing portion 'B' in FIG. 2, FIG. 6 is a conceptual diagram schematically showing a process of releasing a CNT lump portion of a CNT solution in a conical dispersion part according to one embodiment of the present invention, FIG. 7 is a conceptual diagram schematically showing a carbon nanotube dispersion integration device according to one embodiment of the present invention, and FIG. 8 is a perspective view schematically showing a first stirring part and a second stirring part according to one embodiment of the present invention.

Referring to FIGS. 1 to 6, an apparatus 1 for dispersing carbon nanotubes according to one embodiment of the present invention includes a solution receiving part 100 and an ultrasonic vibrator part 200.

The solution receiving part 100 receives a CNT solution 10. The CNT solution 10 is a solution including a carbon nanotube (CNT). The solution receiving part 100 includes a solution receiving body portion 110, a flow pipe portion 120, and a spiral guide portion 130.

The solution receiving body portion 110 is formed in a semi-cylindrical shape in which one surface (a right in FIG. 1) is formed as a planar surface. The flow pipe portion 120 is formed by passing through the inside of the solution receiving body portion 110, and provides a path through which the CNT solution 10 flows. One side (a top in FIG. 1) of the flow pipe portion 120 is an inlet 121, and the other side (a bottom in FIG. 1) is an outlet 123.

In order to form the CNT solution 10 flowing in the flow pipe portion 120 having a set inner diameter D as a laminar flow, when the CNT solution 10 flows at a set speed, individual CNTs in the CNT solution 10 are arranged in a longitudinal direction of the flow pipe portion 120 and flow into the flow pipe portion 120.

When a spherical granular lump portion 15 in the CNT solution 10 is separated, it is advantageous as strong a turbulent flow is given to the CNT solution 10, but in the present invention, the CNT having an elongated linear structure is made as the laminar flow so as to be arranged parallel to the flow of the CNT solution 10. When the CNT strands are arranged parallel to the flow of the CNT solution 10 by making the laminar flow, it is possible to prevent the CNT strands from being damaged by a shear force generated by the turbulent flow.

In order to identify whether the CNT solution 10 flowing through the flow pipe portion 120 is a laminar flow or a turbulent flow, a Reynolds number (Re) is calculated from an equation below.

$$Re = \frac{\rho V D}{\mu} \quad \text{[Equation]}$$

where μ refers to a viscosity coefficient of the CNT solution 10, V refers to a velocity of the CNT solution 10, D refers to an inner diameter of the flow pipe portion 120, and ρ refers to a density of the CNT solution 10.

In the CNT solution 10 flowing in the flow pipe portion 120, the laminar flow is formed when the Reynolds number (Re) calculated by the above equation is about 2,100 or less, and the turbulent flow is formed when the Reynolds number (Re) is 4,000 or more. A zone in which the Re is between 2,000 and 4,000 is called a transition zone. Accordingly, when the viscosity coefficient and density of the CNT solution 10 used are known, the flow of the laminar flow may be obtained by adjusting a diameter of a pipe and a velocity of a fluid.

In the present invention, the inner diameter D of the flow pipe portion 120 is set so that the Reynolds number (Re) is 4,000 or less. Accordingly, the CNT solution 10 flowing through the flow pipe portion 120 is formed in the transition zone or as the laminar flow.

The spiral guide portion 130 is formed on an inner wall of the flow pipe portion 120 to guide the CNT solution 10 to spirally flow. The spiral guide portion 130 has a left spiral type and a right spiral type alternately formed on the inner wall of the flow pipe portion 120 so that a rotation direction is changed at least twice or more.

The spiral guide portion 130 is formed with grooves recessed in or protrusions protruding from the inner wall of the flow pipe unit 120. The spiral guide portion 130 is spirally formed with the grooves or the protrusions on the inner wall of the flow pipe portion 120, and thus the CNT solution 10 receives a rotation force while flowing through the inner wall of the flow pipe portion 120 as if a bullet that travels inside a barrel rotates by a steel wire provided inside the barrel.

The spiral guide portion 130 formed on the inner wall of the flow pipe portion 120 has the left spiral type and the right spiral type alternately formed to change the rotation direction for each set length. The spiral guide portion 130 includes a first spiral guide portion 131, a second spiral guide portion 133, and a third spiral guide portion 135.

The first spiral guide portion 131 is formed in a spiral shape (the right spiral type in FIG. 1) that starts from the inlet 121 and is twisted in one direction. The second spiral guide portion 133 is formed to extend from one side (a bottom in FIG. 1) of the first spiral guide portion 131 and is formed in a spiral shape that is twisted in the other direction (the left spiral type in FIG. 1). The third spiral guide portion 135 is formed to extend from one side (a bottom in FIG. 1) of the second spiral guide portion 133 and is formed in a spiral shape that is twisted in one direction (the right spiral type in FIG. 1).

In the present invention, the spiral guide portion 130 including the first spiral guide portion 131, the second spiral guide portion 133, and the third spiral guide portion 135 described above are formed on the flow pipe portion 120 so that the rotation direction is changed twice. The CNT solution 10 entering the inlet 121 rotates and moves clockwise (CW) while passing through the first spiral guide portion 131, and rotates counterclockwise (CCW) while passing through the second spiral guide portion 133 that is a first rotation direction change point. Then, the rotation direction of the CNT solution 10 is changed clockwise (CW) again from the third spiral guide portion 135 that is a second rotation direction change point.

The spiral guide portion 130 has the above-described spiral shape in which the left spiral type and the right spiral type are continuously formed alternately, and thus the change in the rotation direction can be increased.

The CNT solution 10 is stretched along the spiral guide portion 130 on the inner wall of the flow pipe portion 120 and is alternately twisted between the left spiral type and the right spiral type. Accordingly, the CNT bundle in the CNT solution 10 is loosened like rubbing using hands.

A cross-sectional shape of the groove or protrusion of the flow pipe portion 120 may be selected from hemispherical, circular, and polygonal shapes in consideration of the ease of processing and the like. The grooves or protrusions formed on the inner wall of the flow pipe portion 120 rotate the CNT solution 10 flowing through the flow pipe portion 120.

Since the CNT solution 10 flowing from the flow pipe portion 120 along the spiral guide portion 130 flows at a high speed until just before the turbulent flow occurs, the above-described change in the rotation direction applies a large twist kinetic energy to the CNT bundle in the CNT solution 10.

The flow pipe portion 120 includes a straight pipe portion 120a. The straight pipe portion 120a is formed in a straight line toward the outlet 123 at a lower side of the flow pipe portion 120. The straight pipe portion 120a guides the CNT solution 10 to flow linearly toward the outlet 123. A length of the straight pipe portion 120a is formed to be 1D to 20D with respect to the inner diameter D of the flow pipe portion 120.

The ultrasonic vibrator part 200 is mounted on an outer wall of the solution receiving body portion 110 and provides ultrasonic waves to the CNT solution 10. A plurality of ultrasonic vibrator parts 200 are disposed in the longitudinal direction of the solution receiving body portion 110.

The ultrasonic vibrator part 200 disperses the lump portion 15 of the CNT not dispersed by a Van der Waals force between the CNT strands even with a twist of the flow pipe portion 120 and the spiral guide portion 130 caused by the change in the rotation direction of the CNT solution 10.

The CNT solution 10 flowing along the spiral guide portion 130 receives a twist force while alternating clockwise and counterclockwise. At this time, the CNT solution 10 receives an ultrasonic vibration of the flow pipe portion 120 by the ultrasonic vibrator part 200. This ultrasonic vibration separates the CNT strands of the CNT solution 10 clumped by a Van der Waals attraction.

In other words, the ultrasonic vibrator part 200 receives the ultrasonic vibration in a direction perpendicular to a direction in which the CNT bundles flowing linearly with the flow of the laminar flow inside the flow pipe portion 120 and the spiral guide portion 130 are clumped to receive a force to beat the Van der Waals, and thus the CNT strands are separated. At this time, since the CNT solution 10 including the separated CNTs moves while continuously receiving the twist force alternately clockwise and counterclockwise, the CNT strands once separated are farther away from each other.

The ultrasonic vibrator part 200 includes an ultrasonic vibrator body portion 210 and a contact portion 230. The ultrasonic vibrator body portion 210 accommodates an ultrasonic vibration generation device (not shown) therein. The contact portion 230 has one surface (left in FIG. 1) of the ultrasonic vibrator body portion 210 coming into contact with the outer wall of the solution receiving body portion 110.

When the ultrasonic vibrator is attached to the outer wall of the solution receiving body portion 110 toward the flow pipe portion 120 through which the CNT solution 10 flows, the contact portion 230 is formed to be narrow and long in a direction (vertically in FIG. 1) in which the CNT solution 10 flows in order to intensively apply the ultrasonic vibration to only the flow pipe portion 120.

A width W at which the contact portion 230 comes into contact with the outer wall of the solution receiving body portion 110 is formed to be smaller than the inner diameter D of the flow pipe portion 120 or twice or less the inner diameter D of the flow pipe portion 120.

Since the ultrasonic vibrator part 200 applies ultrasonic waves to the CNT solution 10 flowing through the flow pipe portion 120 and thus all CNTs in the CNT solution 10 flowing through the flow pipe portion 120 evenly receive the ultrasonic force, the ultrasonic waves may evenly irradiate through the entire volume of the fluid passing through the flow pipe portion 120 unlike a method of dispersing a solution around a probe by irradiating ultrasonic waves using an ultrasonic probe within a container, which is a conventional method of dispersing ultrasonic waves, and thus it is possible to obtain a better ultrasonic dispersion effect than that of a conventional ultrasonic dispersion device simply using one ultrasonic probe.

The apparatus 1 for dispersing carbon nanotubes according to the present invention further includes a conical dispersion part 300. The conical dispersion part 300 is mounted inside the outlet 123 of the flow pipe portion 120. The CNT solution 10 is discharged to the outside of the outlet 123 as it collides with the conical dispersion part 300.

The conical dispersion part 300 includes a conical dispersion body portion 310 and a tip portion 320. The conical dispersion body portion 310 is formed in a conical shape, is mounted on the outlet 123, and has an inclined surface that is inclined downward to a bottom of the outlet 123 (based on FIG. 5). The conical dispersion body portion 310 is fixed by a support (not shown) or the like formed to extend from the solution receiving body portion 110.

The tip portion 320 is sharply formed at an end (an upper end in FIG. 1) of the conical dispersion body portion 310. The tip portion 320 collides with the CNT solution 10 before being discharged through the outlet 123 to loosen the lump portion 15 of the CNT solution 10.

The CNT strands attached to the lump portion 15 in parallel in the CNT solution 10 moving down along the flow pipe portion 120 are loosened by the ultrasonic vibration of the ultrasonic vibrator part 200 and the twist force alternating by the spiral guide portion 130, but a part of the lump portion 15 not loosened collides with the tip portion 320 while moving down through the straight pipe portion 120a, and the lump portion 15 itself is loosened by being pulled by a strong flow rate or loosened as the CNT strands are cut by the strong flow rate.

In addition, since a sharp end of the tip portion 320 is positioned inside the path of the CNT solution 10, the CNT solution 10 exits the outlet 123 in a state of having a high pressure and a fast flow rate at the tip portion 320 before exiting the outlet 123, and at this time, the pressure and flow rate of the fluid are rapidly reduced, so that the lump portion 15 of the CNT can be dispersed from each other, thereby obtaining the dispersion effect.

The CNT solution 10 in which the lump portion 15 has been loosened moves down along the inclined surface of the conical dispersion body portion 310.

Referring to FIGS. 7 and 8, the carbon nanotube dispersion integration device according to one embodiment of the present invention includes a tank part 20, a first stirring part 30, a second stirring part 40, a first manifold part 50, and the apparatus 1 for dispersing carbon nanotubes.

The tank part 20 receives the CNT solution 10. The first stirring part 30 stirs the CNT solution 10 by rotating the CNT solution 10 received in the tank part 10. The second stirring part 40 passes through an inside of the first stirring part 30 and stirs the CNT solution 10 by rotating the CNT solution 10 received in the tank part 20.

The first stirring part 30 includes a first rotary shaft portion 31, a disk portion 33, a stirring rod 35, and a first motor portion 37. The first rotary shaft portion 31 has an end (a lower end in FIG. 7) submerged in the tank part 20 and is rotated by receiving power from the first motor portion 37. The first rotary shaft portion 31 is formed in a hollow shape, and a second rotary shaft portion 41 of the second stirring portion 40 is rotatably inserted thereinto.

The disk portion 33 is formed in a disk shape installed at the end of the first rotary shaft portion 31 submerged in the tank part 20. The disk portion 33 is rotated according to the rotation of the first rotary shaft portion 31.

A plurality of stirring rods 35 are mounted on the disk portion 33 in a circumferential direction of the disk portion 33. In other words, the plurality of stirring rods 35 are disposed in an upright shape to be perpendicular to the rotation direction of the rotating disk portion 33.

The first motor portion 37 transmits power to the first rotary shaft portion 31 to rotate the first rotary shaft portion 31.

As the first rotary shaft portion 31 of the first stirring part 30 configured as described above is rotated, the stirring rod 35 crushes the lump in the CNT solution 10 into small pieces.

The second stirring part 40 includes a second rotary shaft portion 41, a stirring fan portion 43, and a second motor portion 45. The second rotary shaft portion 41 is inserted into the first rotary shaft portion 31, has an end (a lower end in FIG. 7) submerged in the tank part 20, and is rotated by receiving power from the second motor portion 45.

The stirring fan portion 43 is composed of a plurality of blades installed at the end of the second rotary shaft portion 41 submerged in the tank part 20. The stirring fan portion 43 is rotated according to the rotation of the second rotary shaft portion 41.

The second motor portion 45 transmits power to the second rotary shaft portion 41 to rotate the second rotary shaft portion 41.

As the second rotary shaft portion 41 of the second stirring part 40 configured as described above is rotated, the stirring fan portion 43 is rotated and crushes the lump in the CNT solution 10 into small pieces together with the stirring rod 35 of the first stirring part 30.

Alternatively, the first stirring part 30 and the second stirring part 40 may be operated together, but may be selectively operated so that any one of the first stirring part 30 and the second stirring part 40 may be operated.

The first manifold part 50 communicates with the tank part 20 and receives the CNT solution 10 stirred by the first stirring part 30 or the second stirring part 40.

The apparatus 1 for dispersing carbon nanotubes receives the CNT solution 10 from the first manifold part 50 and disperses the CNT solution 10. A structure and operation of the apparatus 1 for dispersing carbon nanotubes are replaced with the above description.

The second manifold part 60 communicates with the flow pipe portion 120 to receive the dispersed CNT solution 10. The first manifold part 50 is disposed at a top of the apparatus 1 for dispersing carbon nanotubes (based on FIG. 7), and the second manifold part 60 is disposed at a bottom of the apparatus 1 for dispersing carbon nanotubes (based on FIG. 7).

In the present invention, at least one apparatus 1 for dispersing carbon nanotubes is installed between the first manifold part 50 and the second manifold part 60. A plurality of apparatus 1 for dispersing carbon nanotubes may be disposed between the first manifold part 50 and the second manifold part 60, and thus more CNT solutions 10 may be dispersed than when dispersed through one apparatus for dispersing carbon nanotubes as the CNT solution 10 supplied from the first manifold part 50 passes through the plurality of apparatus 1 for dispersing carbon nanotubes.

The outlet 123 of the apparatus 1 for dispersing carbon nanotubes is connected to the second manifold part 60, and the dispersed CNT solutions 10 are combined in the second manifold part 60 and go back to the tank part 20.

The second manifold part 60 communicates with the tank part 20 through a pipe, and a pump part 70 is disposed in the middle of the corresponding pipe to transmit the CNT solution 10 discharged from the second manifold part 60 to the tank part.

The carbon nanotube dispersion integration device according to the present invention further includes a heat exchange part 80. The heat exchange part 80 is disposed between the tank part 20 and the first manifold part 50, and cools the CNT solution 10 to a set temperature. Since the CNT solution 10 may generate heat by the rotation of the first rotary shaft portion 31 of the first stirring part 30 or the second rotary shaft portion 41 of the second stirring part 40, the CNT solution 10 may be cooled by the heat exchanger 80 in which a coolant flows.

Alternatively, the heat exchange part 80 is disposed between the tank part 20 and the first manifold part 50, and heats the CNT solution 10 to a set temperature. The heat exchange part 80 may be mounted to also supply hot water or steam in addition to the coolant and may heat the circulated CNT solution 10 to the set temperature.

The carbon nanotube dispersion integration device according to the present invention further includes the pump part 70. The pump part 70 causes the CNT solution 10 discharged from the second manifold part 60 to flow to the tank part 20. The CNT solution 10 dispersed by an operation of the pump part 70 flows to the tank part 20. The CNT solution 10 returned to the tank part 20 is stirred and dispersed according to set conditions while repeating the above-described operation.

According to the present invention, a CNT solution can be formed as a laminar flow while spirally flowing by a spiral guide part of a solution receiving part and dispersed by an ultrasonic vibration of an ultrasonic vibrator part.

In addition, according to the present invention, it is possible to loosen a lump portion of the CNT solution by a conical dispersion part installed at an outlet of the solution receiving part.

In addition, according to the present invention, a plurality of apparatus for dispersing carbon nanotubes is disposed in parallel to circulate the CNT solution to a tank part, so that it is possible to solve problems such as damage to CNT strands, the difficulty in separating the lump of the CNT, the difficulty in evenly dispersing the entire solution, high manufacturing costs, and an increase in dispersion time, and evenly disperse the CNT solution.

While the present invention has been described with reference to one embodiment shown in the drawings, this is only illustrative, and those skilled in the art to which the corresponding technique pertains will understand that various modifications and other equivalent embodiments are possible therefrom. Accordingly, the true technical scope of the present invention should be defined by the appended claims.

The invention claimed is:

1. An apparatus for dispersing carbon nanotubes, comprising:
a solution receiving part including: a solution receiving body portion; a flow pipe portion formed by passing through an inside of the solution receiving body portion, and through which a CNT solution flows; and a spiral guide portion formed on an inner wall of the flow pipe portion and configured to guide the CNT solution to spirally flow; and
an ultrasonic vibrator part mounted on an outer wall of the solution receiving body portion, and configured to provide ultrasonic waves to the CNT solution,
wherein the spiral guide portion has a right spiral type and a left spiral type alternately formed on the inner wall of the flow pipe portion so that a rotation direction is changed twice or more.

2. The apparatus of claim 1, wherein a Reynolds number of the CNT solution is calculated by an equation below, and an inner diameter of the flow pipe portion is set so that the Reynolds number is 4,000 or less,
the equation is $$Re = \frac{\rho V D}{\mu},$$

where $\mu$ refers to a viscosity coefficient of the CNT solution,
V refers to a velocity of the CNT solution,
D refers to an inner diameter of the flow pipe portion, and
$\rho$ refers to a density of the CNT solution.

3. The apparatus of claim 1, further comprising a conical dispersion part mounted an inside an outlet of the flow pipe portion, and configured to allow the CNT solution to collide and be discharged to an outside of the outlet along an inclined surface.

4. The apparatus of claim 3, wherein the flow pipe portion includes a straight pipe portion configured to guide the CNT solution to flow linearly toward the outlet.

5. The apparatus of claim 1, wherein the spiral guide portion is formed with grooves recessed in or protrusions protruding from the inner wall of the flow pipe portion.

6. The apparatus of claim 1, wherein the ultrasonic vibrator part includes a contact portion configured to come into contact with an outer wall of the solution receiving body portion, and
a width at which the contact portion comes into contact with the outer wall of the solution receiving body portion is formed to be smaller than an inner diameter of the flow pipe portion, or twice or less the inner diameter of the flow pipe portion.

* * * * *